May 21, 1935.   A. J. SCHOLTES   2,002,046
POLYCYCLE PROPULSION MEANS
Filed July 13, 1934    2 Sheets-Sheet 2

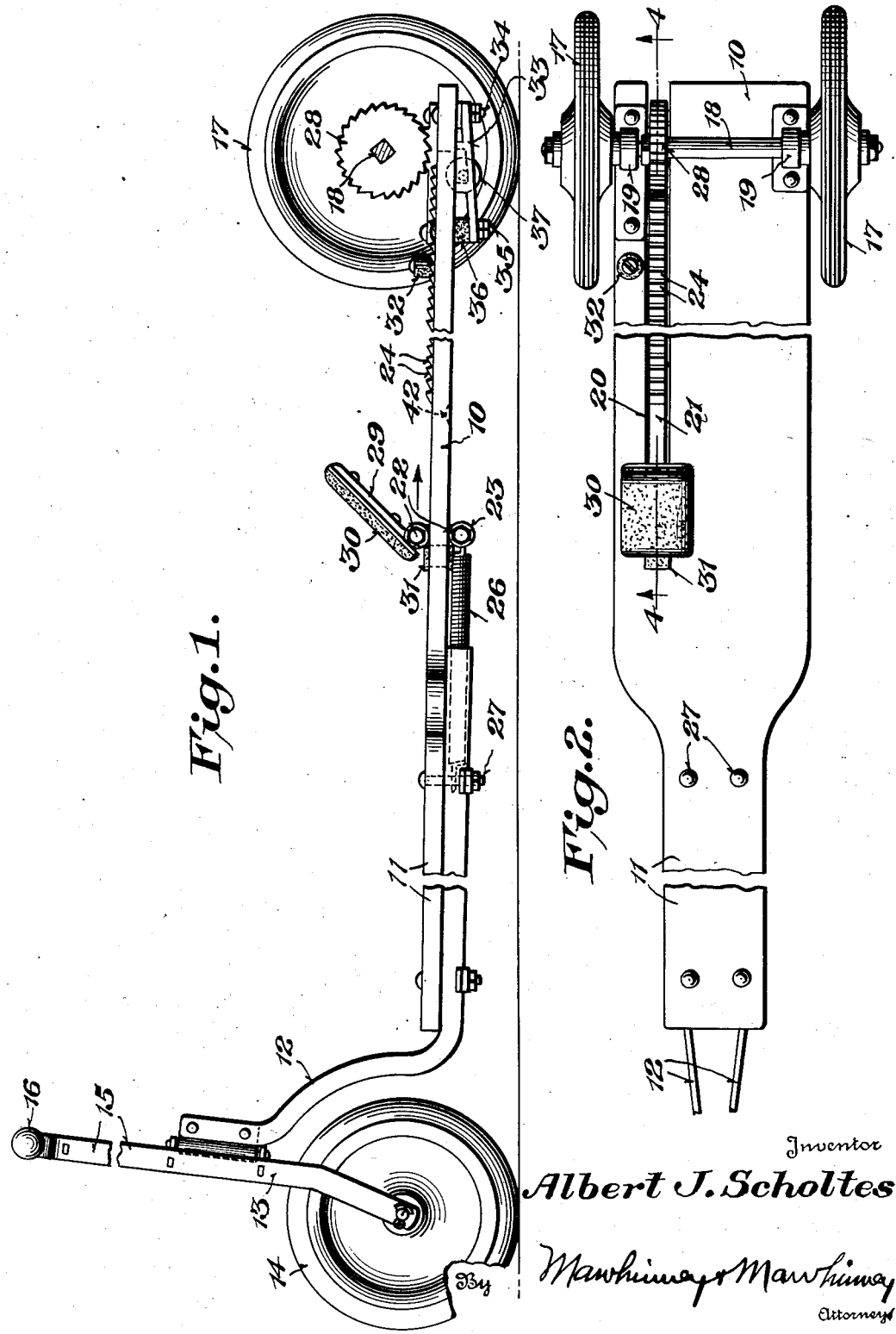

Inventor
Albert J. Scholtes,
By Mawhinney & Mawhinney
Attorneys

Patented May 21, 1935

2,002,046

UNITED STATES PATENT OFFICE 2,002,046

POLYCYCLE PROPULSION MEANS

Albert J. Scholtes, Baltimore, Md.

Application July 13, 1934, Serial No. 735,035

11 Claims. (Cl. 208—37)

The present invention relates to propelled vehicles adaptable to toy construction, and has for an object to provide a vehicle which may support the rider in a standing position and may be propelled by the movement of the foot on the vehicle without contact with the ground with substantially the same swinging motion as is required to advance the vehicle by actual impelling contact of the foot with the ground at one side of the vehicle.

Another object is to enable the rider to move the vehicle more swiftly than heretofore with the same swinging movement of the foot.

A further object of the invention is to provide a ratchet drive for the vehicle wherein the contacting parts are separated when actual driving is not taking place so as to reduce wear on the several parts of the mechanism.

A still further object is to provide a driving mechanism of this character which has relatively few parts so constructed and relatively disposed as to leave the body portion of the vehicle free and unobstructed for the feet of the rider and which insures rigidity and strength to the entire structure, and the parts cannot be easily damaged by the falling over and jarring of the vehicle and cannot easily get out of order.

The invention also embodies features which may be incorporated in vehicles of various types and which may be easily operated by the foot or otherwise to meet desired conditions of application and use.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a propelled vehicle embodying the features of the present invention.

Figure 2 is a top plan view of the same, the forward end being broken away.

Figure 3:
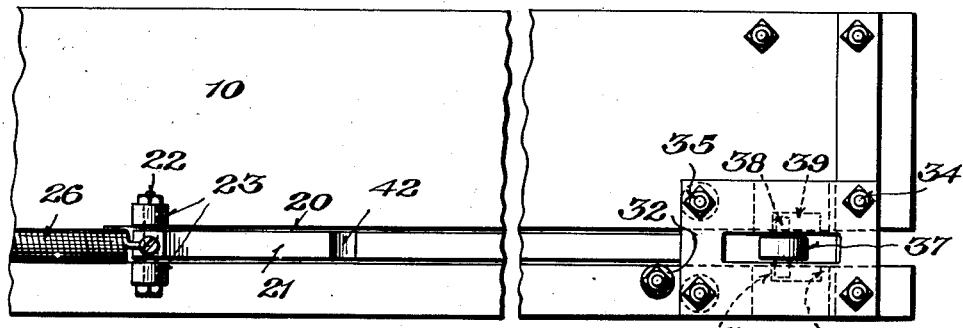
Figure 3 is a fragmentary enlarged bottom plan view of the rear portion of the vehicle platform, showing the mounting of the rack bar and the pressure or advancing means therefor.

Referring now to the drawings, the body of the vehicle is shown in the present instance as comprising a platform 10 of suitable width at its rear and intermediate portions to support the feet of a rider in standing position and which may be reduced at its forward end to provide a neck 11 to which is secured a front bracket 12 carrying a pivoted fork 13 in which a front wheel 14 is mounted for supporting the forward end of the platform 10. The fork 13 may be carried upwardly beyond the bracket 12 to any desired height for accommodating the rider in standing or other position and to provide a standard 15 having a handle bar 16 or the like at its upper end by means of which the rider may balance himself upon the vehicle.

The rear end of the platform 10 is supported in the present illustration upon a pair of traction wheels 17 fixed upon the opposite ends of a drive shaft 18 and the latter preferably engages across and in spaced relation to the upper side of the platform 10. Bearing standards 19 are bolted or otherwise suitably secured to the upper side of the platform 10 adjacent the opposite lateral edges thereof for engaging the drive shaft 18.

Extending longitudinally in one side portion of the platform 10 is a longitudinal slot 20 in which is freely mounted a rack bar 21. The forward end of the rack bar 21 has a T-head with the projecting portions extending upwardly and downwardly from the opposite sides of the slot 20 and these branches or projections of the T-head are provided with transverse bolts or pins 22 supporting pairs of rollers 23 which engage the upper and lower sides of the platform 10 at the opposite sides of the groove 20 so as to slidably and pivotally anchor the forward end of the rack bar 21 to the platform 10. The rear end of the rack bar 21 is free to rise and fall in the slot 20 and the rack bar is provided throughout the major portion of its length and toward its rear end with a plurality of ratchet teeth 24 having the engaging faces 25 thereof slightly inclined to insure the easy release of the ratchet or rack bar 21 under conditions which will be subsequently brought out.

The rack bar 21 is normally urged forwardly in the slot 20 by a spring 26 or the like which has one end anchored to the lower branch of the T-head and which has its other end secured upon a bolt 27 or the like which is employed in holding the bracket 12 to the forward end of the platform. This spring 26 also serves to normally urge the rear end of the rack bar downwardly through the slot 20.

Suitably fixed upon the drive shaft 18 is a ratchet wheel 28 disposed in line with the rack bar 21 and having its ratchet teeth formed similarly to the teeth 24 with the inclined engaging faces 25.

These inclined sides or faces 25 of the teeth insure the separation of the rack bar from the ratchet when the relative movements are opposite to that effecting a driving action.

The rack bar 21 is forced backwardly against the tension of the spring 26 by a pedal 29 which may be integral with the upper branch of the T-head of the rack bar and which is suitably inclined to receive the sole of the foot thereagainst. A pad or cushion 30 may be mounted on the pedal 29 and the platform 10 has a resilient bumper 31 in the forward end of the slot 20 to receive and cushion the impact of the rack bar 21 when moved forwardly by the spring 26 and has a second cushion or bumper 32 disposed on the platform at one side of the slot 20 preferably in line with one of the upper rollers 23 so as to limit the rearward movement of the rack bar under pressure of the foot. An inclined guide 33 is mounted beneath the rear end of the platform and the rack bar 21 and is secured to the platform by bolts 34 and 35, the latter being the forward bolts and preferably being of greater length than the rear bolts 34 to accommodate a spacer or cushioning element 36 between the platform and the forward end of the guide 33. The spacer 36 urges the guide in a forwardly and downwardly inclined position, this inclination being with reference to the effective parts of the guide as the latter may be of any exterior construction facilitating mounting on the vehicle.

Within the guide is disposed a pressure or lifting roller 37 which engages against the lower side of the rack bar 21 and supports it. The roller 37 has trunnions 38 which project from opposite sides of the roller and engage inclined trackways 39 which extend upwardly and rearwardly so that when the roller 37 is advanced or shifted toward the rear end of the platform the roller 37 is raised so as to swing the rear end of the rack bar 21 upwardly into engagement with the ratchet wheel 28. To facilitate the raising of the roller 37, the rear end portion of the rack bar 21 is provided with a notch or recess 40 of suitable size to fit the upper portion of the roller 37 so that upon the initial backward movement of the rack bar 21 the roller 37 is moved upwardly in the guide and the rack bar 21 is raised with the roller until the trunnions 38 strike the rear stops 41 whereupon the rack bar 21 is lifted by the roller 37 into intermeshing engagement with the ratchet wheel 28 and the roller 37 is held in its raised position by frictional contact of the rack bar 21 during its rearward power stroke.

Figure 4:
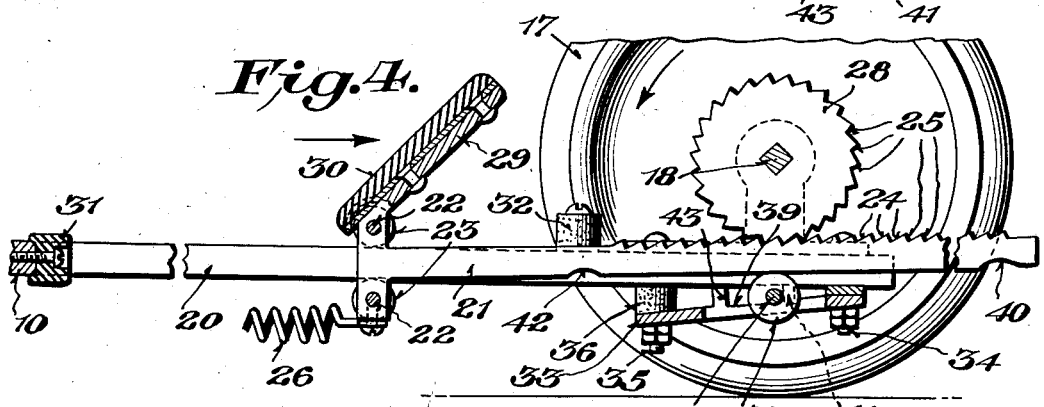
Figure 4 is an enlarged longitudinal section taken on the line 4—4 of Figure 2, showing the parts in driving position.
Figure 5:
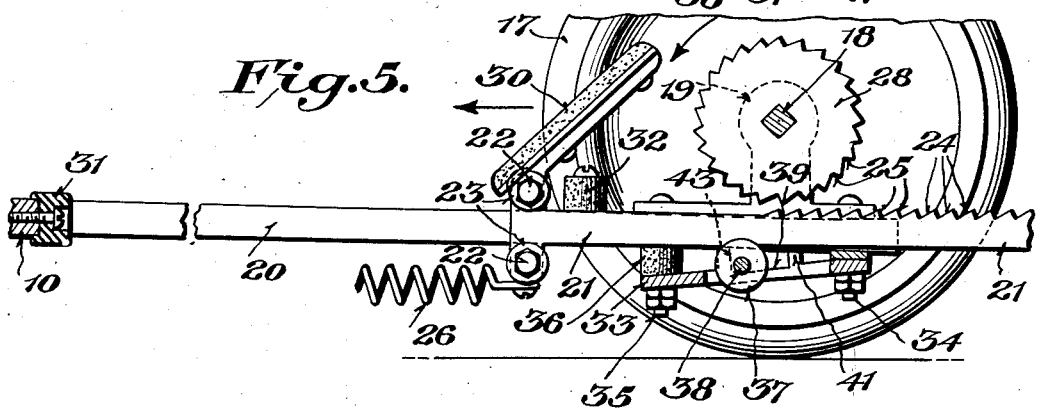
Figure 5 is a like view showing the parts in released position and about the return for a new power stroke.

This position of the parts is shown in Figure 4. As shown in Figure 5, after the power stroke is completed a forward notch or recess 42 in the intermediate portion of the rack bar 21 receives the upper portion of the roller 37 and the initial return or forward movement of the rack bar 21 carries the roller 37 into engagement with the front stops 43 to hold the roller 37 in a lowered position so that the rack bar 21 is free to drop down into the slot 20 under the action of the spring 26 as well as by its own weight.

The rack bar is thus freed from the ratchet wheel 28, as shown in Figure 5, and may move forwardly into its initial position for the power stroke.

In operation, the rider stands upon the platform 10 and balances the body by grasping the handle bar 16. The weight of the body is supported upon the left foot in accordance with the particular structure shown and described therein, and the right foot is placed with the sole of the foot against the pad 30 of the pedal 29. The right foot is then swung rearwardly with the same motion as is necessary to move the vehicle forward by engaging the foot with the ground. However, the backward swinging movement of the foot against the pedal 29 forces the rack bar 21 rearwardly and the roller 37, resting in the recess 40, is slid backwardly and upwardly in the guide 39 until the trunnions 38 strike the stop 41. The further forcing of the pedal 29 rearwardly increases the pressure of the rack bar against the roller 38 with the result that the rack bar rides upwardly over the roller 37 and raises the recessed portion 40 of the rack bar out of contact with the roller. This rise of the rack bar on the roller brings the teeth 24 of the rack bar and the ratchet wheel 28 into intermeshing engagement and turns the ratchet wheel 28 with its axle 18, and consequently rotates the traction wheels 17 to propel the vehicle.

When the rack bar reaches its rear most position, at the end of the power stroke, the notch 42 of the rack bar registers with the roller 37 and the rack bar 21 is permitted to fall away from the ratchet wheel 28, thus releasing the rack bar from the ratchet wheel. The pressure of the foot is now released from the pedal 29 whereupon the spring 26 exerts a pressure upon the rack bar 21 to force the latter forwardly, and the return movement of the rack bar causes the notched portion 42 thereof to pull the roller 37 forwardly and downwardly against the front stop 43 whereupon the rack bar may freely move over the roller. The spring 26, being connected to the lower end of the T-head of the rack bar, exerts a downward pressure upon the rear end of the rack bar as well as a pressure to move the bar forwardly so that the rack bar is held out of accidental contact with the ratchet wheel 28 incident to vibration of the vehicle.

It will be noted, particularly from Figures 1 and 4, that the rack teeth 24 of the bar 21 terminate rearwardly of the vertical plane of the recess 42 so as to leave a free and smooth surface portion at the forward end of the rack above the recess 42. This construction is for the purpose of insuring that at the end of the power stroke the rack runs out of mesh with the ratchet wheel 28 before the rack bar 21 is lowered as the recess portion 42 registers with the roller 37.

From Figure 4 it will be seen that the recess 40 is disposed beneath the rear end of the rack teeth 24 so that as the roller 37 raises the rack bar 21 the teeth will be brought into intermeshing engagement with the teeth of the ratchet 28, the axis of the roller 37 being at this time in line beneath the axis of the ratchet wheel 28. The roller 37 when forward and lowered is out of vertical line with the axis of the ratchet wheel 28 and the rack teeth must be in position to intermesh immediately the roller and rack are raised. Also the teeth 24 of the rack must not extend rearwardly beyond the recessed portion 40 because should the rear end of the rack bar 21 be accidentally raised when in a normal forward position intermeshing of the rack and ratchet is not desired, and the rack bar 21 is smooth at its rear end.

What is claimed is:—

1. In a propelled vehicle, a body portion having a traction element, operating means, and connecting means operable to connect the operating means to the traction element upon a predetermined movement of the operating means and to release the operating means upon a different predetermined movement thereof.

2. In a propelled vehicle, a body portion having a wheel with a pinion connected thereto, a rack bar on the body portion adapted to be reciprocated, and advancing and retracting means for the rack bar engageable thereby for moving the rack bar against the pinion when the rack bar is moved in one direction and for releasing the rack bar from the pinion when the rack bar is moved in an opposite direction.

3. In a propelled vehicle, a body portion having a traction wheel, a gear member for turning the wheel, a rack bar member on the body portion, and relatively movable means for the members engageable by the rack bar member to intermesh the members when the rack bar member is moved in one direction and to disengage the members when the rack member is moved in an opposite direction.

4. In a propelled vehicle, a body portion having a traction wheel with a drive pinion thereon, a reciprocable rack bar on the body portion, and means for meshing the rack bar with the pinion when the bar is moved in one direction and for releasing the rack bar from the pinion when the bar is moved in an opposite direction.

5. In a propelled vehicle, a body portion having a traction wheel thereon, a drive ratchet wheel connected to the traction wheel, a ratchet bar slidably mounted on the body portion for turning the ratchet wheel when the bar is moved in one direction, and means for advancing the bar against the ratchet wheel when the bar is moved in said direction to turn the traction wheel, said means being releasable by the bar upon the return movement thereof to free the bar from the ratchet wheel.

6. In a propelled vehicle, a body portion having a wheel with a drive pinion connected thereto, a rack bar mounted for reciprocation upon the body portion, a shiftable pressure member mounted on the body portion at the under side of the rack bar remote from the pinion, an inclined guide for the pressure member, and pressure member engaging means on the opposite end portions of the rack bar for shifting the member and moving the rack bar into engagement with the pinion upon the initial movement of the rack bar in one direction and for shifting the member to release the rack bar from the pinion upon the initial movement of the rack bar in the opposite direction.

7. In a propelled vehicle, a body portion having a traction wheel with a drive pinion thereon, a rack bar slidably mounted on the body portion, means for normally urging the rack bar out of engagement with the pinion, means for reciprocating the rack bar, and means operable by the rack bar when reciprocated for raising the rack bar into engagement with the pinion upon the power stroke of the rack bar and for releasing the rack bar upon its return stroke.

8. In a propelled vehicle, a body portion having a traction wheel with a drive pinion connected thereto, a rack bar mounted for longitudinal sliding movement on the body portion, means for yieldingly holding the rack bar out of engagement with said pinion, a roller, an inclined guide disposed lengthwise beneath the rack bar on the body portion and said roller having trunnions engaging the inclined guide, said guide having spaced stop means for limiting the movement of the trunnions lengthwise of the guide, and roller engaging portions disposed at opposite ends of the rack bar for alternate engagement with the roller to raise the same against the under side of the rack bar on the power stroke thereof and intermesh the rack bar with the pinion and to move the roller in the opposite direction for lowering the rack bar on the return stroke to free the bar from the pinion.

9. In a propelled vehicle, a body portion having a traction wheel and a drive pinion connected thereto, a rack bar mounted in the body portion for reciprocation beneath the pinion, pedal means for operating the rack bar, an inclined guide carried by the body portion beneath the rack bar, a roller disposed beneath the rack bar and having trunnions mounted on said guide, and roller engaging means disposed at opposite ends of the toothed portion of the rack bar for alternate engagement with the roller to shift the same lengthwise on the guide beneath the rack bar for raising and lowering the bar upon the respective power and return strokes thereof.

10. In a propelled vehicle, a platform having a longitudinal slot therein, a shaft mounted on the platform and having traction wheels on opposite ends for supporting the body and having a ratchet wheel in register with said slot, a rack bar mounted in the slot of the body portion and normally biased to a forwardly slid position, said rack bar having a T-head at its forward end extending in the slot with one branch extending below the platform and its other branch rising from the platform, a pedal mounted on the upper branch of the T-head, rollers carried by the T-head for engaging the upper and lower surfaces of the platform to pivotally and slidably anchor the forward end of the rack bar to the platform, said pedal adapted to receive pressure of the foot for forcing the rack bar rearwardly, and rack bar lifting means carried by the platform and operable by the rack bar on the power stroke thereof to raise the same into intermeshing engagement with said ratchet wheel.

11. In a propelled vehicle, a body portion having a traction wheel, a ratchet wheel connected to the traction wheel and having inclined faces on the teeth thereof, a rack bar slidably mounted in the body portion and having ratchet teeth for intermeshing with the ratchet wheel and also having inclined faces on its teeth whereby to insure easy separation of the rack bar and the ratchet wheel at times, an inclined guide operatively associated with the rack bar, means for sliding the rack bar in one direction to effect a power stroke, means for returning the rack bar to initial position, and connecting means movable on the guide and operable by the rack bar upon the power stroke thereof to move the rack bar into intermeshing engagement with said ratchet wheel.

ALBERT J. SCHOLTES.